US012587783B2

(12) United States Patent
Park

(10) Patent No.: US 12,587,783 B2
(45) Date of Patent: Mar. 24, 2026

(54) MICROPHONE DEVICE WITH ADJUSTABLE AIMING ANGLE AND VOICE RECOGNITION SYSTEM AND VOICE RECOGNITION METHOD USING THE SAME

(71) Applicants: HYUNDAI MOTOR COMPANY, Seoul (KR); KIA CORPORATION, Seoul (KR)

(72) Inventor: Danghee Park, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 243 days.

(21) Appl. No.: 18/623,752

(22) Filed: Apr. 1, 2024

(65) Prior Publication Data

US 2025/0150756 A1 May 8, 2025

(30) Foreign Application Priority Data

Nov. 7, 2023 (KR) ........................ 10-2023-0152280

(51) Int. Cl.
*H04R 1/40* (2006.01)
*H04R 1/04* (2006.01)
*H04R 1/08* (2006.01)
*H04R 5/027* (2006.01)

(52) U.S. Cl.
CPC ............... *H04R 1/406* (2013.01); *H04R 1/04* (2013.01); *H04R 1/08* (2013.01); *H04R 5/027* (2013.01)

(58) Field of Classification Search
CPC . H04R 1/406; H04R 1/04; H04R 1/08; H04R 5/027
USPC .................................. 381/26, 122, 124, 365
See application file for complete search history.

(56) References Cited

U.S. PATENT DOCUMENTS

2012/0050527 A1* 3/2012 Lee ........................ F16M 11/18 348/135
2014/0185814 A1* 7/2014 Cutler .................... H04R 5/027 381/26
2014/0233764 A1* 8/2014 Mathis ..................... H04R 1/08 381/122
2016/0148057 A1* 5/2016 Oh ....................... G06V 10/803 348/143

* cited by examiner

FOREIGN PATENT DOCUMENTS

KR 10-2537879 B1 5/2020
KR 10-2524128 B1 4/2023

*Primary Examiner* — William A Jerez Lora
(74) *Attorney, Agent, or Firm* — MCDONNELL BOEHNEN HULBERT & BERGHOFF LLP

(57) ABSTRACT

Disclosed is a microphone device with an adjustable aiming angle. The microphone device includes a frame, a plurality of microphones, each including a head which detects a voice of a user and a body extending in a length direction from the head toward a reference point and hingedly connected to the frame, at least one barrier rib which passes the reference point, extends in a radial direction, and has a predetermined height in a vertical direction to physically divide the plurality of microphones; and an angle adjustment device which is slidably connected to one end of the body extending in the length direction toward the reference point in the length direction of the body to rotate the corresponding microphone relative to the frame in the vertical direction. A voice recognition system and a voice recognition method using the microphone device are further provided.

20 Claims, 12 Drawing Sheets

MICROPHONE DEVICE WITH ADJUSTABLE AIMING ANGLE AND VOICE RECOGNITION SYSTEM AND VOICE RECOGNITION METHOD USING THE SAME

CROSS-REFERENCE TO RELATED APPLICATION

This application claims priority to and the benefit of Korean Patent Application No. 10-2023-0152280 filed in the Korean Intellectual Property Office on Nov. 7, 2023, the entire contents of which are incorporated herein by reference.

BACKGROUND

(a) Field

The present disclosure relates to a microphone device and a voice recognition system and a voice recognition method using the same, and more particularly, to a microphone device with an adjustable aiming angle and a voice recognition system and method which more accurately recognize a voice of a speaker by adjusting an aiming angle.

(b) Description of the Related Art

A voice recognition system refers to a system which converts a human voice to a code, to input the converted code to a computing device. A vehicular voice recognition system analyzes a speaker's voice to transmit an instruction corresponding the voice to a corresponding device to execute a vehicle function desired by the speaker. A plurality of occupants may ride in the vehicle, such that it is necessary to be able to accurately recognize the speaker.

Conventionally, when a plurality of occupants rides the vehicle, a beam forming technique or a noise cancelling technique using a dual microphone for every seat has been utilized to recognize a voice. These techniques require at least eight microphone systems for a 4-seat vehicle, which may increase the cost of the vehicle and the development cost.

The matters described in the background art section are written for better understanding of the background of the invention and may include matters which are not the related art already known to a person of an ordinary skill in the art.

SUMMARY

The present disclosure attempts to provide a microphone which easily adjusts an aiming angle and a voice recognition system and method which separate a plurality of microphones with an adjustable aiming angle by a physical barrier rib to remove a sound excluding a voice signal of the speaker as a noise to more accurately recognize a speaker's voice.

According to an aspect of the present disclosure, a microphone device with an adjustable aiming angle is provided.

The microphone device includes a frame, a plurality of microphones, each including a head which detects a voice of a user and a body extending in a length direction from the head toward a reference point and hingedly connected to the frame, at least one barrier rib which passes the reference point, extends in a radial direction, and has a predetermined height in a vertical direction to physically divide the plurality of microphones, and an angle adjustment device which is slidably connected to one end of the body extending in the length direction toward the reference point in the length direction of the body to rotate the corresponding microphone relative to the frame in the vertical direction.

The angle adjustment device includes an adjustment rod including one end which extends to an outside of the frame to be slidably connected to one end of the body, and another end which is disposed in the frame and includes a gear unit, a motor which includes a motor shaft and receives power to rotate the motor shaft, and a driving gear which is fixedly mounted at the motor shaft to rotate together with the motor shaft and is engaged with the gear unit of the adjustment rod to move the adjustment rod along an extension direction while rotating.

A slot is formed in the body in the length direction and concave rail grooves are formed on both sides of the slot, and protrusions protruding to both sides are formed on both sides of the adjustment rod to be disposed in the corresponding rail grooves.

A width between the protrusions is equal to or smaller than a width between the rail grooves and larger than a width of the slot so that the protrusions are slidable along the slot and the rail groove, but do not deviate from the slot.

The body is hingedly connected to the frame through a hinge pin to be hinged so that as the adjustment rod slidably connected to the one end of the body moves along the extension direction, the microphone rotates around the hinge pin in the vertical direction.

The at least one barrier rib divides a space in the vehicle into a plurality of areas according to seated positions of a user and one microphone is disposed in one area.

According to another aspect of the present disclosure, a voice recognition system is disclosed. The voice recognition system includes a calling unit configured to receive a start intention of the voice recognition system and generate a system start signal, an image recognition unit configured to detect an image of a user, a microphone device including a plurality of microphones configured to detect a voice of the user, a controller configured to receive the system start signal from the calling unit to generate a system activation signal, transmit the system activation signal to the image recognition unit and the microphone device to activate the voice recognition system, receive the image of the user from the image recognition unit in an active state of the voice recognition system to extract a skeleton of the user from the image of the user, estimate an utterance point of the user on the skeleton of the user, determine the microphone corresponding to the estimated utterance point, calculate a movement amount to allow the corresponding microphone to be directed to the utterance point, and move the corresponding microphone by the movement amount.

The corresponding microphone is further configured to move by the movement amount and detect the voice of the user to transmit the voice to the controller, and the controller is further configured to receive the voice of the user detected by the corresponding microphone and recognize an instruction indicated by the voice.

The controller is further configured to execute a function according to the recognized instruction.

The calling unit is at least one of a physical button, the microphone, the image recognition unit, and a touch screen.

The microphone device further includes at least one barrier rib which passes a reference point, extends in a radial direction, and has a predetermined height in a vertical direction to physically divide the plurality of microphones, and an angle adjustment device which is slidably connected to the corresponding microphone extending in the length direction toward the reference point in the length direction of the corresponding microphone to rotate the microphone relative to the frame in the vertical direction, and each microphone includes a head which detects the voice of the user and a body which extends in the length direction from the head toward the reference point and is hingedly connected to the frame.

The angle adjustment device includes an adjustment rod including one end which extends to an outside of the frame to be slidably connected to one end of the body and the other end which is disposed in the frame and includes a gear unit, a motor which includes a motor shaft and receives a power to rotate the motor shaft, and a driving gear which is fixedly mounted at the motor shaft to rotate together with the motor shaft and is engaged with the gear unit of the adjustment rod to move the adjustment rod along an extension direction while rotating.

A slot is formed in the body in the length direction and concave rail grooves are formed on both sides of the slot, and protrusions protruding to both sides are formed on both sides of the adjustment rod to be disposed in the corresponding rail grooves.

A width between the protrusions is equal to or smaller than a width between the rail grooves and larger than a width of the slot so that the protrusions are slidable along the slot and the rail groove, but do not deviate from the slot.

The body is hingedly connected to the frame through a hinge pin so that as the adjustment rod, which is slidably connected to an end of the body, moves along the extension direction, the microphone rotates around the hinge pin in the vertical direction.

The at least one barrier rib divides a space in the vehicle into a plurality of areas according to seated positions of the user, and one microphone is disposed in one area.

According to still another aspect of the present disclosure, a voice recognition method using a voice recognition system is provided. The voice recognition method includes generating a system start signal, by a calling unit which receives a start intention of a voice recognition system, generating a system activation signal by receiving the system start signal from the calling unit, by a controller; activating the voice recognition system by the system activation signal, by the controller, extracting a skeleton of a user by receiving an image of the user in an active state of the voice recognition system, by the controller, estimating an utterance point of the user on the skeleton of the user, by the controller, determining a microphone corresponding to the estimated utterance point, among a plurality of microphones included in a microphone device, by the controller, calculating a movement amount to allow the corresponding microphone to be directed to the utterance point, by the controller, and moving the corresponding microphone by the movement amount, by the controller.

The voice recognition method further includes detecting a voice of the user to transmit the voice to the controller, by the corresponding microphone, and recognizing an instruction indicated by the voice by receiving the voice of the user, by the controller.

The voice recognition method further includes executing a function according to the recognized instruction, by the controller.

The calling unit is at least one of a physical button, the microphone, the image recognition unit, and a touch screen.

According to the present disclosure, the driving gear and the gear unit of the adjustment rod are meshed to move the adjustment rod which is slidably coupled to the microphone, so that the aiming angle of the microphone may be easily adjusted.

The plurality of microphones with an adjustable aiming angle is divided by a physical barrier rib to accurately recognize the position of the speaker. Further, a sound excluding a voice signal of the speaker is removed as a noise to more accurately recognize the voice of the speaker.

In addition, effects which may be achieved or predicted by the exemplary embodiment of the present disclosure will be disclosed directly or implicitly in the detailed description of the exemplary embodiment of the present disclosure. That is, various effects which may be predicted according to the exemplary embodiment of the present disclosure will be disclosed in the detailed description below.

BRIEF DESCRIPTION OF THE DRAWINGS

Exemplary embodiments of the present specification will be better understood by referring to the following description in conjunction with the accompanying drawings in which like reference numerals denote identical or functionally similar elements.

Figure 1:
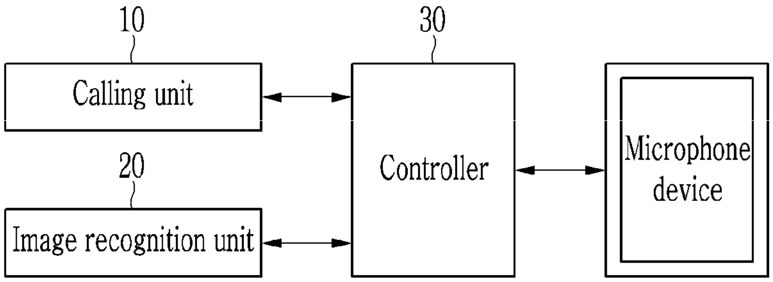
FIG. 1 is a block diagram of a voice recognition system according to an exemplary embodiment of the present disclosure.

It should be understood that the drawings referenced above are not necessarily drawn to scale, but somewhat simplified expressions of various preferred features which illustrate a basic principle of the present disclosure is presented. For example, specific design features of the present disclosure including a specific dimension, direction, position, and shape may be partially determined by a specifically intended application and a usage environment.

DETAILED DESCRIPTION

The term used herein is solely for the purpose of describing specific exemplary embodiments, but is not intended to limit the present disclosure. As used herein, singular forms are intended to also include plural forms unless the context clearly indicates otherwise. The term "include" and/or "including", when used herein, specify the presence of mentioned features, integers, steps, operations, constituent elements and/or components, but it is also understood that this does not exclude presence or addition of one or more of other features, integers, steps, operations, constituent elements, components and/or groups thereof. As used herein, the term "and/or" includes any one or all combinations of associated listed items.

"Mobility" or other similar terms used in the specification includes general land mobility such as passenger vehicles including a sports utility vehicle (SUV), buses, trucks, and various commercial vehicles, a marine mobility including various boats and ships, and aerial mobility including aircrafts and drones and includes all objects which may move by receiving a power from a power source. Further, it is understood that "mobility" or other similar terms used in the specification includes a hybrid mobility, an electric mobility, a plug-in hybrid mobility, a hydrogen power mobility, and mobility of other alternative fuels (for example, fuels derived from sources other than petroleum). As mentioned in the specification, the hybrid mobility includes a mobility having two or more power sources, for example, a gasoline power and electric power mobility. Mobility according to an exemplary embodiment of the present disclosure includes not only mobility which is manually driven, but also autonomously and/or automatically driven mobility.

Additionally, it is understood that one or more of the following methods and aspects thereof are executed by at least one or more controllers. The term "controller" may refer to a hardware device including a memory and a processor. The memory is configured to store program instructions and the processor is particularly programmed to execute program instructions to perform one or more processors to be described in more detail below. The controller controls operations of units, modules, components, devices, or the like, as described herein. Further, it is understood that the following methods may be executed by a device including the controller together with one or more other components as recognized by a person of an ordinary skill in the art.

Further, the controller of the present disclosure may be implemented as a non-transitory computer-readable recording medium including executable program instructions executed by a processor. Examples of computer-readable recording media include ROM, RAM, compact disk (CD) ROM, magnetic tapes, floppy disks, flash drives, smart cards, and optical data storage devices, but is not limited thereto. The computer-readable recording medium may also be distributed throughout a computer network so that program instructions may be stored and executed in a distributed manner, for example, on a telematics server or a Controller Area Network (CAN).

Hereinafter, exemplary embodiments of the present disclosure will be described in more detail with reference to the accompanying drawings.

FIG. 1 is a block diagram of a voice recognition system according to an exemplary embodiment of the present disclosure.

As illustrated in FIG. 1, a voice recognition system according to an exemplary embodiment of the present disclosure includes a calling unit 10, an image recognition unit 20, a controller 30, and a microphone device.

The calling unit 10 receives an intention to start the system from the user, generates a system start signal and transmits the system start signal to the controller 30. The calling unit 10 includes various user input interfaces, such as a physical button mounted at a steering wheel in a vehicle, a microphone 40 which recognizes a voice of the user, an image recognition unit 20 which recognizes a gesture of the user, and a touch screen, among other features. The user may generate the system start signal by pressing the physical button, speaking a predetermined instruction, making a predetermined gesture, or pressing a corresponding button on the touch screen.

The image recognition unit 20 detects an image of the user and transmits the detected image of the user to the controller 30. The image recognition unit 20 may, in some embodiments, be a camera which captures a user (for example, a driver or an occupant) in the vehicle.

The controller 30 is communicably connected to the calling unit 10, the image recognition unit 20, and the microphone device. The controller 30 receives a system start signal from the calling unit 10 to generate a system activation signal and transmit the system activation signal to the image recognition unit 20 and the microphone device to activate the system. In a system active state, the controller 30 receives the image of the user from the image recognition unit 20 and extracts a skeleton of the user from the image of the user (see FIG. 4). Further, the controller 30 analyzes the skeleton of the user to estimate an utterance point 70 of the user, determines the microphone 40 corresponding to the estimated utterance point 70, calculates a movement amount (for example, a rotation amount) to allow the corresponding microphone 40 to be directed to the utterance point 70, and moves the corresponding microphone 40 by the movement amount.

The controller 30 receives the voice of the user detected and sent by the microphone 40, remove a noise from the voice, and recognizes an instruction indicated by the voice. Further, the controller 30 executes a function according to the recognized instruction. That is, the controller 30 transmits a control instruction to a related device to execute a corresponding function.

To this end, one or more of microprocessors is provided in the controller 30 and the one or more of microprocessors may be programmed to perform each step of a voice recognition method according to an exemplary embodiment of the present disclosure. In particular, the controller 30 includes a memory and in the memory, various algorithms for carrying out the present disclosure, such as a skeleton extraction algorithm which extracts the skeleton of the user from the image of the user, an utterance point estimation algorithm which estimates the utterance point from the skeleton, and a voice recognition algorithm which recognizes the voice of the user are stored. Various applicable algorithms are known to a person of an ordinary skill in the art.

The microphone device includes a plurality of microphones 40 and each microphone 40 detects the voice of the user in a corresponding position and transmits the detected voice of the user to the controller 30. Further, each microphone 40 receives the control signal from the controller 30 and moves by the movement amount indicated by the control signal. Accordingly, an aiming angle of each microphone 40 may be controlled.

Figure 2:
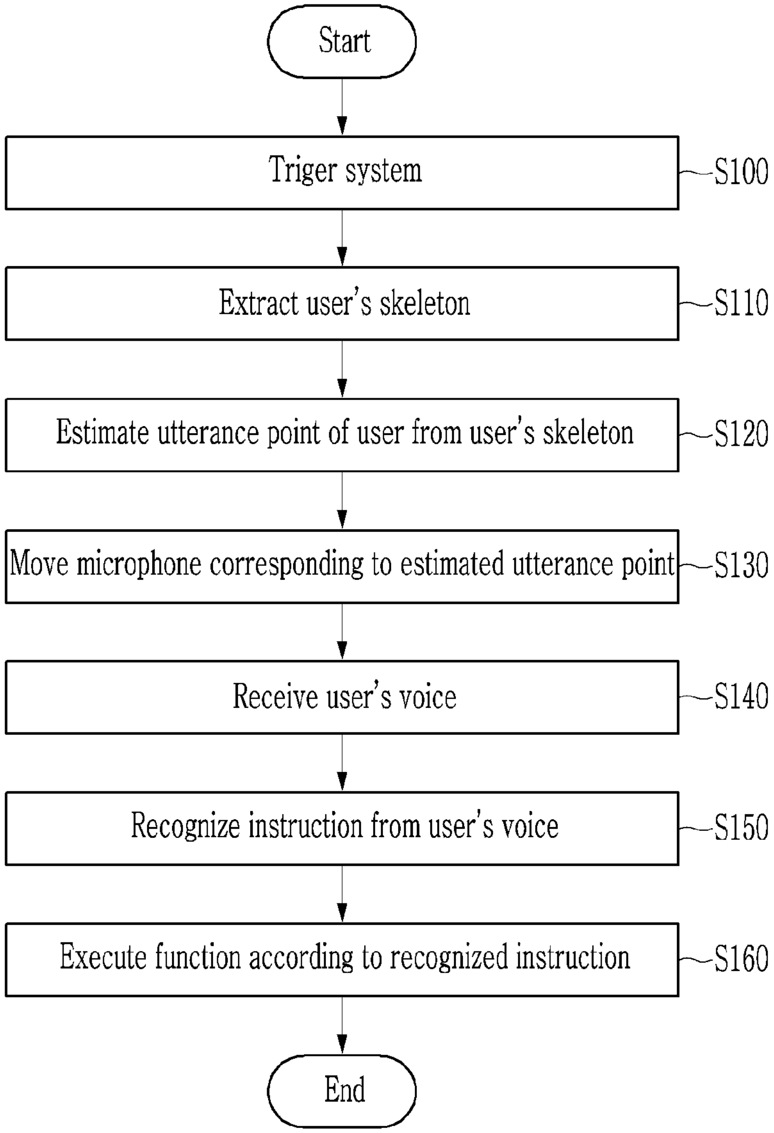
FIG. 2 is a flowchart of a voice recognition method according to another exemplary embodiment of the present disclosure.
Figure 3:
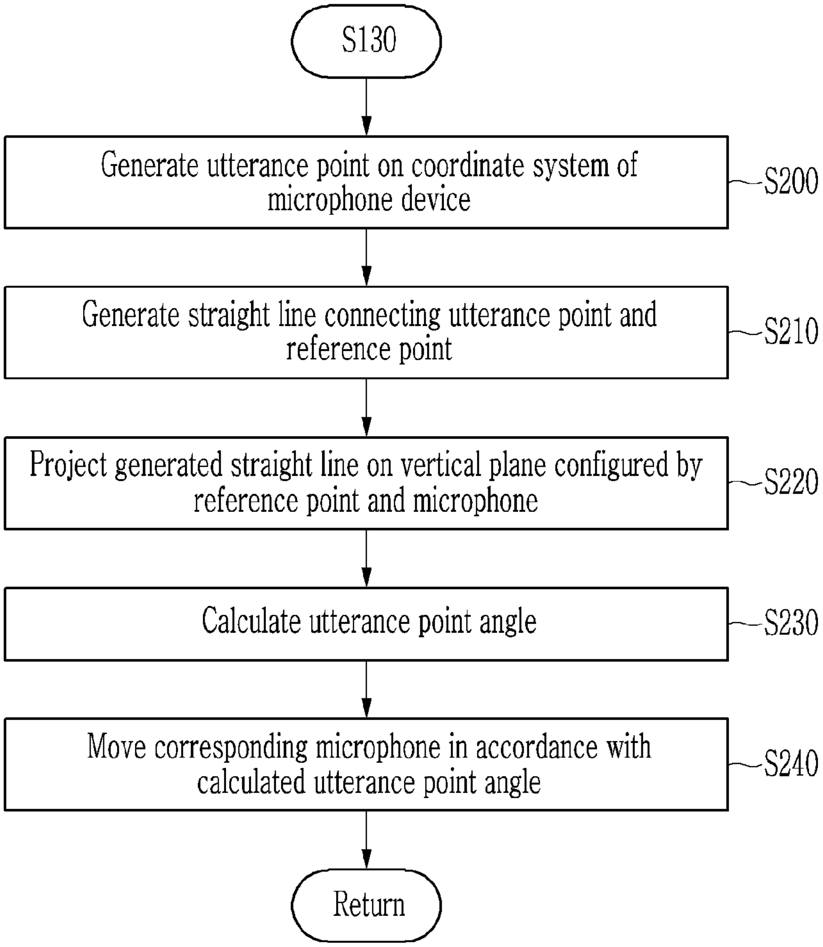
FIG. 3 is a flowchart detailing the step S130 in FIG. 2.
Figure 4:
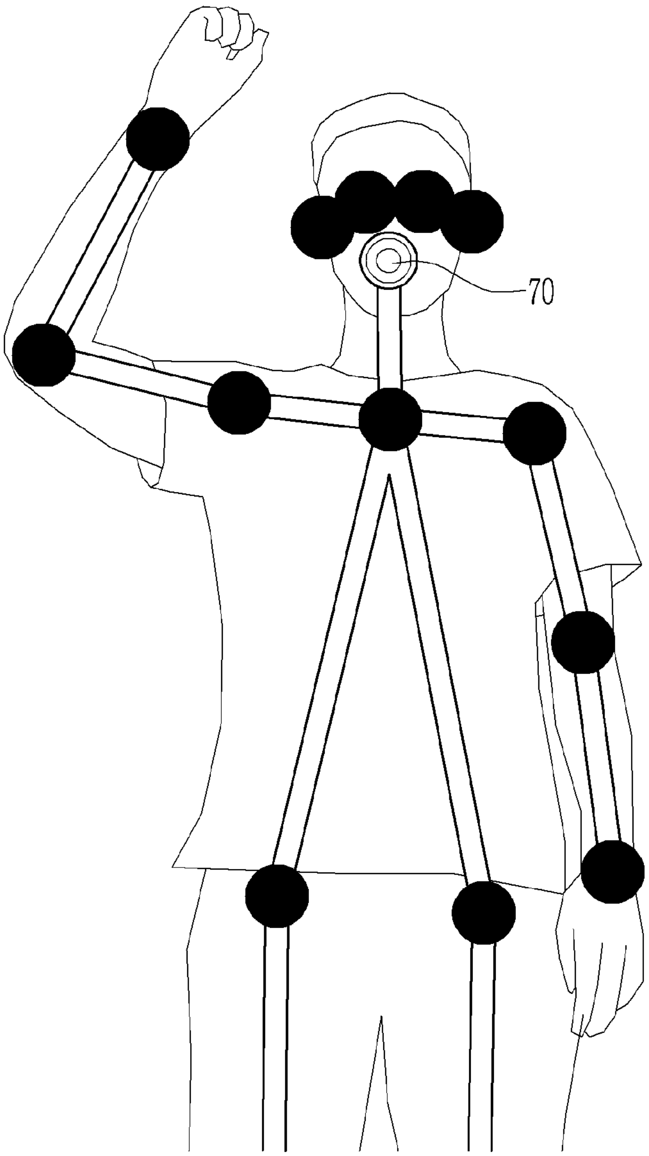
FIG. 4 schematically illustrates a skeleton of a user recognized by an image recognition unit.

FIG. 2 is a flowchart of a voice recognition method according to another exemplary embodiment of the present disclosure, FIG. 3 is a flowchart detailing step S130 in FIG. 2, and FIG. 4 schematically illustrates a skeleton of a user recognized by an image recognition unit.

As illustrated in FIG. 2, the voice recognition method according to another exemplary embodiment of the present disclosure starts by detecting a system start intention from the user. That is, the user may represent the system start intention by pressing the physical button, speaking the predetermined instruction, making the predetermined gesture, or pressing the corresponding button on the touch screen. The calling unit 10 detects the system start intention to generate the system start signal and transmits the system start signal to the controller 30.

When the system start signal is received, the controller 30 generates the system activation signal and transmits the generated system activation signal to the image recognition unit 20 and the microphone device to start (activate) the system in step S100. Further, the controller 30 estimates the position of the user in the vehicle from the system start signal. For example, when the user presses the physical button, a position corresponding to the pressed physical button is estimated as the position of the user. When the user speaks the predetermined instruction, the position of the user may be estimated based on a volume of the user detected by the plurality of microphones 40. When the user makes the predetermined gesture or presses the corresponding button on the touch screen, the position of the user may be estimated based on a motion of the user recognized by the image recognition unit 20.

When the image recognition unit 20 receives the system activation signal, the image recognition unit 20 captures the image of the user in the vehicle and transmits the image of the user to the controller 30. The controller 30 analyzes the image of the user received from the image recognition unit 20 to extract the skeleton of the user from the image of the user in step S110.

The controller 30 estimates the utterance point 70 of the user from the skeleton of the user in step S120. For example, as illustrated in FIG. 4, the controller 30 estimates a position (located between a chest and eyes) corresponding to a neck of the user from the skeleton of the user, estimates a position (located above the eyes) corresponding to a forehead of the user, and estimates the position (that is, a position corresponding to a lip of the user) of the utterance point 70 between the position corresponding to the neck and the position corresponding to the forehead. A method for estimating the utterance point 70 from the skeleton is not limited to the method described herein and various estimating methods known to a person of an ordinary skill in the art may be used.

When the utterance point 70 of the user is estimated, the controller 30 moves the corresponding microphone 40 in accordance with the estimated utterance point 70 in step S130. Hereinafter, the step S130 will be described in more detail with reference to FIG. 3.

As illustrated in FIG. 3, when the utterance point 70 of the user is estimated, the utterance point 70 is generated on a coordinate system of the predetermined microphone device in step S200. For example, the coordinate system of the predetermined microphone device may be a 3D coordinate system with a center of the plurality of microphones 40 as an origin O (that is, a reference point), but is not limited thereto. The controller 30 generates the utterance point 70 on the coordinate system of the microphone device based on a relative position of a seat on which the user is seated with respect to the origin O and a relative position of the utterance point 70 with respect to the seated seat.

When the utterance point 70 is generated on the coordinate system of the microphone device, the controller 30 generates a straight line which connects the utterance point 70 and the reference point O in step S210 and generates a straight line projected on a vertical plane configured by the reference point O and the microphone 40 in step S220.

Thereafter, the controller 30 calculates an utterance point angle between an extension line along which the microphone 40 extends from the reference point O and the projected straight line in step S230 and moves the microphone 40 in accordance with the calculated utterance point angle in step S240. Therefore, the controller 30 adjusts the aiming angle of the microphone 40 in accordance with the utterance point of the user.

Referring to FIG. 2 again, when the controller 30 adjusts the aiming angle of the microphone 40 in accordance with the utterance point of the user, the microphone 40 detects the voice of the user and the controller 30 receives the voice of the user detected by the microphone 40 in step S140. Thereafter, the controller 30 removes the noise from the voice by means of the noise removal algorithm and recognizes the instruction from the voice from which the noise is removed in step S150. When the instruction is recognized, the controller 30 transmits the control instruction according to the recognized instruction to the device to execute the function in accordance with the recognized instruction in step S160. For example, when the user says "open the left window", the controller 30 transmits the control instruction corresponding to opening of the left window to an actuator which controls opening/closing of the left window to allow the actuator to perform an operation which opens the left window.

As described above, according to exemplary embodiments of the present disclosure, the aiming angle of the microphone 40 is adjusted in accordance with the utterance point of the user to increase a noise removal efficiency and more accurately recognize the voice of the user.

Hereinafter, a microphone device with an adjustable aiming angle which is applicable to the voice recognition system and the voice recognition method according to the exemplary embodiments of the present disclosure will be described in more detail.

Figure 5:
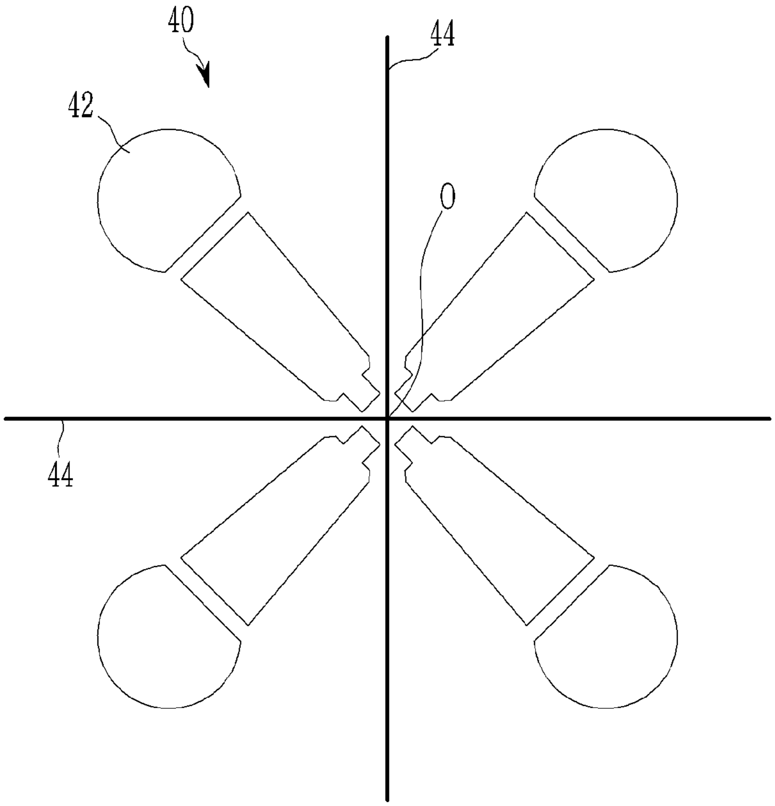
FIG. 5 illustrates one example of a microphone device according to still another exemplary embodiment of the present disclosure.
Figure 6:
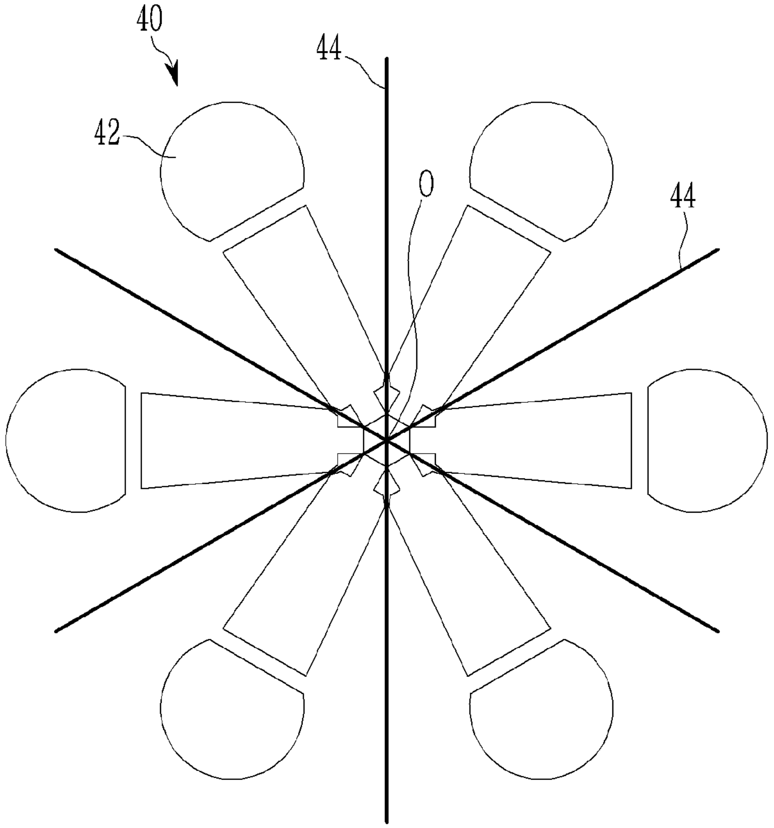
FIG. 6 illustrates another example of a microphone device according to still another exemplary embodiment of the present disclosure.
Figure 7:
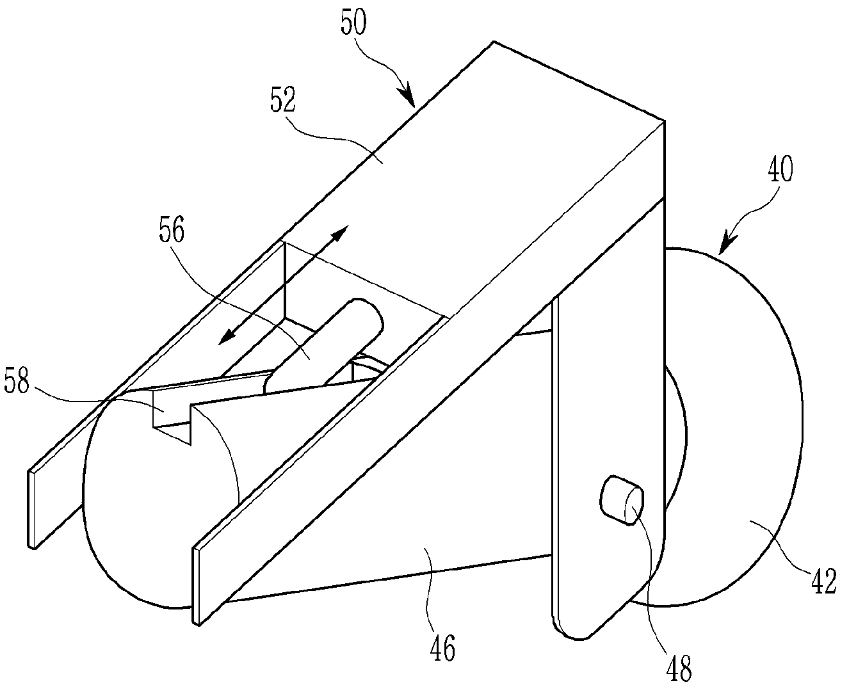
FIG. 7 is a perspective view of a microphone with an adjustable aiming angle.
Figure 8:
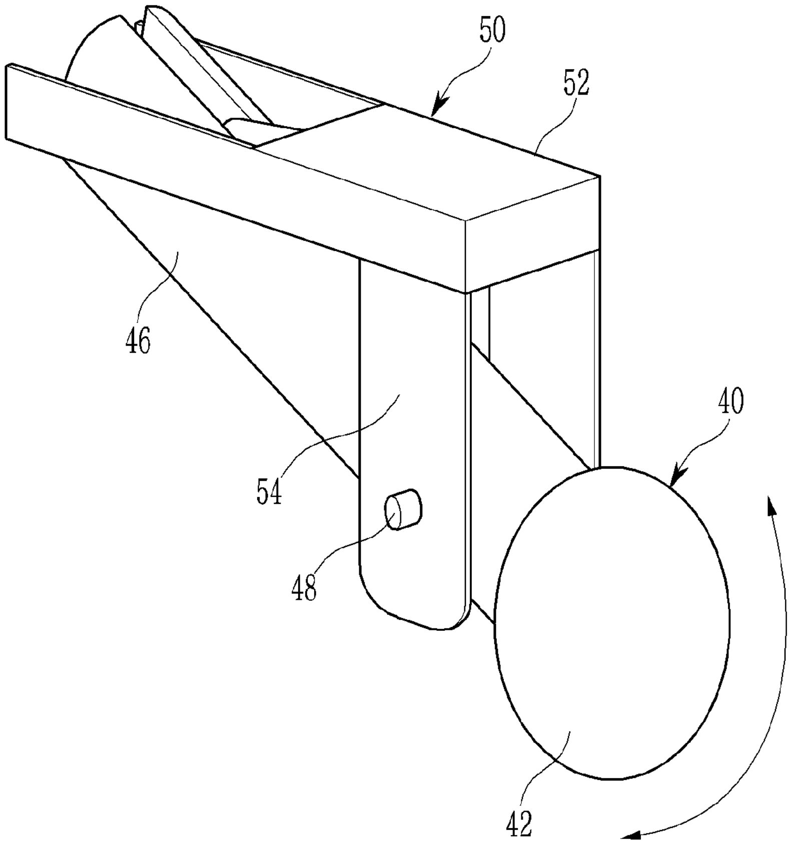
FIG. 8 is another perspective view of a microphone with an adjustable aiming angle.
Figure 9:
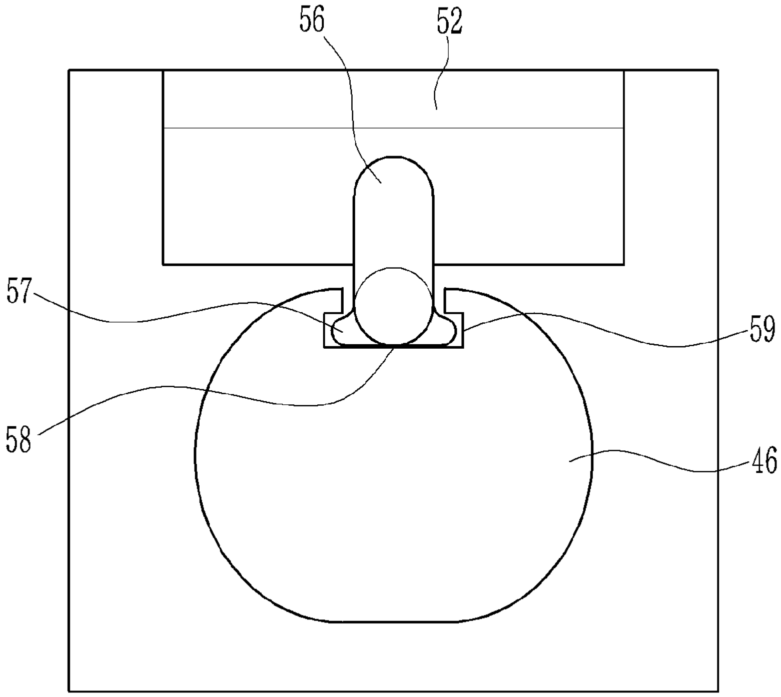
FIG. 9 is a schematic diagram illustrating a combination of an adjustment rod and a microphone.
Figure 10:
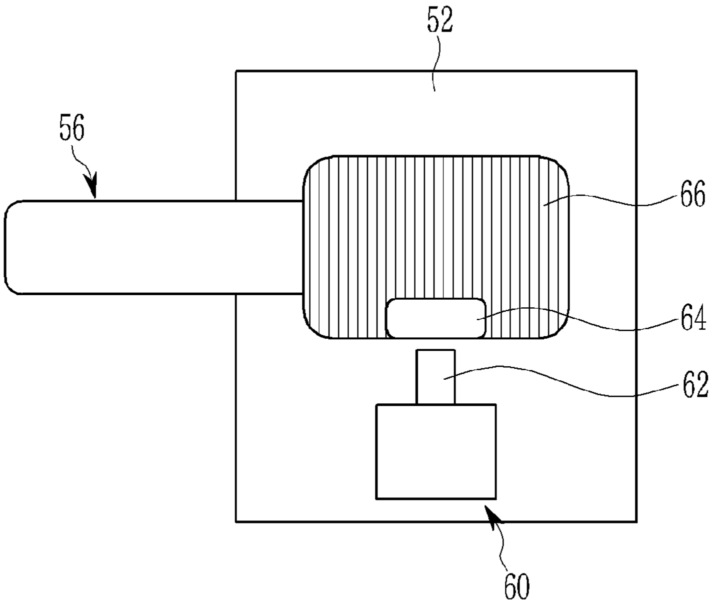
FIG. 10 is a schematic diagram illustrating an operative combination of an adjustment rod and a motor.
Figure 11:
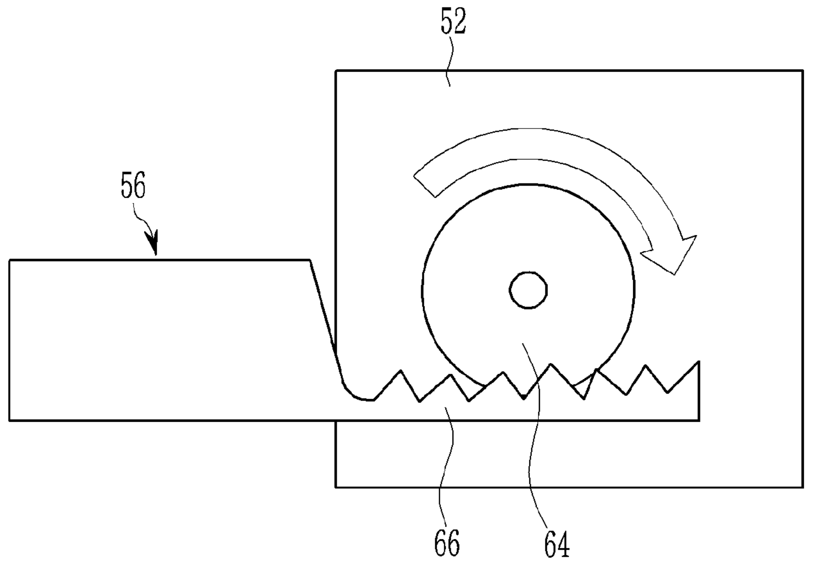
FIG. 11 is another schematic diagram illustrating an operative combination of an adjustment rod and a motor.

FIG. 5 illustrates one example of a microphone device according to yet another exemplary embodiment of the present disclosure; FIG. 6 illustrates another example of a microphone device according to still another exemplary embodiment of the present disclosure; FIG. 7 is a perspective view of a microphone with an adjustable aiming angle; FIG. 8 is another perspective view of a microphone with an adjustable aiming angle; FIG. 9 is a schematic diagram illustrating a combination of an adjustment rod and a microphone; FIG. 10 is a schematic diagram illustrating an operative combination of an adjustment rod and a motor; and FIG. 11 is another schematic diagram illustrating an operative combination of an adjustment rod and a motor.

As illustrated in FIGS. 5 and 6, the microphone device according to yet another exemplary embodiment of the present disclosure includes the plurality of microphones 40 and at least one barrier rib 44. In the microphone device, the plurality of microphones 40 is combined to detect voices of the plurality of occupants and the at least one barrier rib 44 physically divides between the plurality of microphones 40 to easily distinguish a speaker and easily remove the noise.

In one example, as illustrated in FIG. 5, the microphone device may be used in a four-seat vehicle and include four microphones 40 and two barrier ribs 44. In FIG. 5, the microphone 40 at a left upper side is the microphone 40 for a driver and detects a voice of the driver, the microphone 40 at a right upper side is the microphone 40 for a front passenger seat and detects a voice of a user seated in the front passenger seat. The microphone 40 at a left lower side is the microphone 40 for a user seated in a left back seat and detects a voice of the user seated in the left back seat and the microphone 40 at a right lower side is the microphone 40 for a right back seat and detects a voice of a user seated in the right back seat.

The two barrier ribs 44 perpendicularly intersect at the reference point O to physically separate the four microphones 40. A space around the microphones 40 is divided into four areas by the two barrier ribs 44 and the corresponding microphone 40 is located in each of the four areas.

In another example, as illustrated in FIG. 6, the microphone device may be used in a six-seat vehicle and include six microphones 40 and three barrier ribs 44. In FIG. 6, the microphone 40 at the left upper side detects the voice of the driver, the microphone 40 at the right upper side detects the voice of the user seated in the front passenger seat, the microphone 40 at a left center detects a voice of a user seated in a left center seat, the microphone 40 at a right center detects a voice of a user seated in a right center seat, the microphone 40 at a left lower side detects a voice of a user seated in a left back seat, and the microphone 40 at a right lower side detects a voice of a user seated in a right back seat.

The three barrier ribs 44 intersect with an angular interval of 60° in the reference point O to physically separate between the six microphones 40. A space around the microphones 40 is divided into six areas by the three barrier ribs 44 and the corresponding microphone 40 is located in each of the six areas.

An area for each microphone 40 is divided by the barrier rib 44 so that a sound generated in one area is best detected by the microphone 40 located in the corresponding area.

Figure 12:
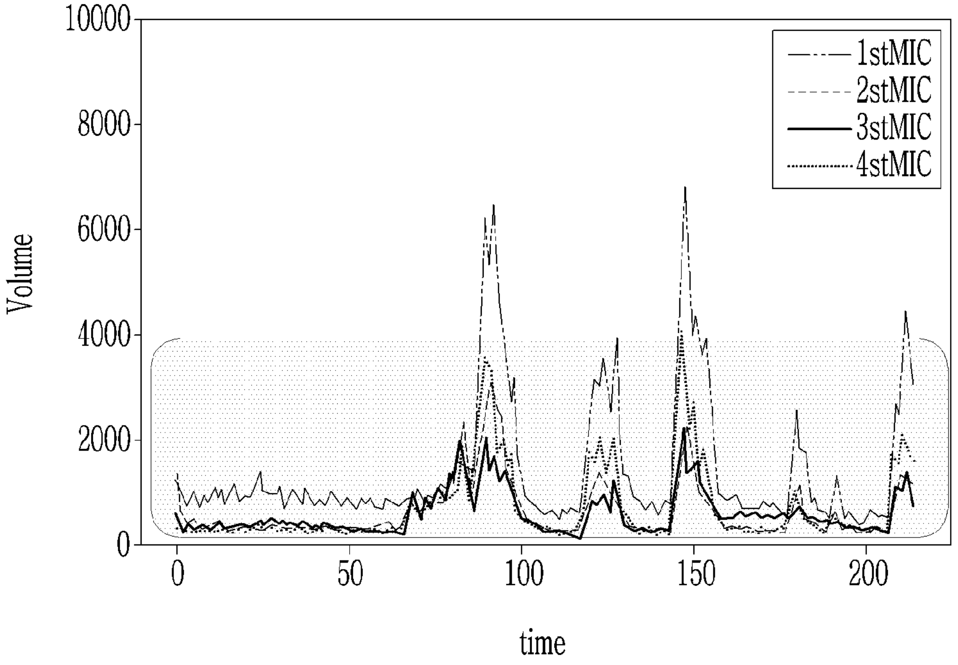
FIG. 12 is an example of a graph illustrating a volume of a sound measured by four microphones mounted in a vehicle.

In one example, as illustrated in FIG. 12, when the volume detected by a first microphone is the highest, it is understood that the speaker is located in an area where the first microphone is located. Accordingly, according to the present disclosure, the position of the speaker may be easily distinguished. Further, the voice detected by the first microphone includes an actual voice of the speaker and the voice of the user is recognized only with the sound detected by the first microphone so that voices detected by a second microphone to a fourth microphone may be removed as the noises. For example, the sound with a predetermined volume or lower is treated as the noise to be removed. As described above, according to the present disclosure, a noise removal strategy which easily removes the noise may be implemented.

According to an exemplary embodiment of the present disclosure, the areas divided by the at least one barrier rib 44 is based on the position in which the user is seated and the microphone device is disposed in the vehicle so as to locate one microphone 40 in one area. For example, in the four-seat vehicle, the microphone device is located at a central portion of a roof panel or a central portion of a floor panel, one barrier rib 44 extends to a length direction of the vehicle and another barrier rib 44 extends in a width direction of the vehicle to divide a space in the vehicle into a driver seat area, a front passenger seat area, a left back seat area, and a right back seat area. However, the position of the microphone device is not limited to the position described in the present specification, but may be any position which divides the space in the vehicle into the plurality of areas in which the user is seated, and one microphone 40 is disposed in each of the plurality of areas.

The microphone device will be described in further detail with reference to FIGS. 5 to 11.

As illustrated in FIGS. 5 to 8, each microphone 40 extends in a length direction with the reference point O as a center. That is, when the microphone 40 virtually extends in the length direction, the microphone has a straight line extending in the length direction which passes through the reference point O.

The microphone 40 includes a head 42 and a body 46. The head 42 is configured to detect the voice of the user. The body 46 extends in the length direction toward the corresponding seat to allow the head 42 to better detect the voice of the user, and the head 42 is coupled to one end of the body 46, which is far from the reference point O. The other end of the body 46 is located to be close to the reference point O. The microphone 40 vertically rotates on a vertical plane configured by the reference point O and the microphone 40 to adjust the aiming angle in accordance with the utterance point of the user. A configuration which adjusts the aiming angle of the microphone 40 will be described below.

The at least one barrier rib 44 is formed to have a plate shape which extends in a radial direction, passing the reference point O, and has a predetermined height in a vertical direction. The at least one barrier rib 44 physically divides the plurality of microphones 40 to divide the area in the vehicle into the plurality of areas according to the seated position of the user. Therefore, in one area, one microphone 40 is disposed and the one microphone 40 may detect the sound generated in the one area better than the other microphones 40 (see FIG. 12).

Here, when a length direction of the microphone 40 is projected on a horizontal plane including the reference point O, it is the radial direction. However, an angle is formed in the vertical direction between the length direction of the microphone 40 and the radial direction on the horizontal plane so that the length direction and the radial direction are separately used.

As illustrated in FIGS. 7 to 11, the microphone device further includes a frame 50 and an angle adjustment device.

The frame 50 includes a first frame 52 and a pair of second frames 54. The first frame 52 and the second frames 54 are vertically connected to provide a space in which the angle adjustment device is mounted and the microphone 40 vertically rotates. However, the first frame 52 and the second frames 54 are not limited to being vertically connected, but may be connected to each other to provide the space in which the angle adjustment device is mounted and the microphone 40 vertically rotates.

In one example, the first frame 52 horizontally extends and the pair of second frames 54 vertically extend at both sides of one end of the first frame 52. The body 46 of the microphone 40 is located between the pair of second frames 54. The body 46 is connected to the pair of second frames 54 by a hinge pin 48 to be hinged so that the microphone 40 is rotatable vertically around the hinge pin 48.

The angle adjustment device includes an adjustment rod 56, a slot 58, a motor 60, and a driving gear 64.

The adjustment rod 56 includes a first, one end and a second, another end. The another end of the adjustment rod 56 is disposed in the frame 50, particularly in the first frame 52 and includes a gear unit 66. The one end of the adjustment rod 56 extends to an outside of the frame 50 to be slidably coupled to the body 46. To this end, the slot 58 is formed in the body 46 in the length direction and concave rail grooves 59 are formed on both sides of the slot 58. Further, protrusions 57 which protrude on both sides are formed on both sides of the adjustment rod 56 to be disposed in the rail groove 59. A width between the protrusions 57 is equal to or smaller than a width between the rail grooves 59 and larger than a width of the slot 58 so that the protrusions 57 are slidable along the slot 58 and the rail groove 59, but do not deviate from the slot 58.

The adjustment rod 56 is movable in an extension direction of the adjustment rod 56 or an opposite direction. An angle is formed in a vertical direction between an extension direction of the adjustment rod 56 and the extension direction (equal to the length direction) of the slot 58. When the adjustment rod 56 moves along the extension direction of the adjustment rod 56, the angle between the extension direction of the adjustment rod 56 and the extension direction of the slot 58 is changed and thus the aiming angle of the microphone 40 is adjusted.

The motor 60 is disposed within the frame 50, particularly in the first frame 52, and includes a motor shaft 62 extending in a direction perpendicular to the extension direction of the adjustment rod 56. The driving gear 64, which is engaged with a gear unit 66, is fixedly mounted in the motor shaft 62. When the motor 60 receives power from a power source to rotate the motor shaft 62, the driving gear 64, which is fixedly mounted in the motor shaft 62, also rotates. When the driving gear 64 rotates, the adjustment rod 56 which includes the gear unit 66 engaged with the driving gear 64 moves along the extension direction of the adjustment rod 56. As described above, when the adjustment rod 56 moves along the extension direction of the adjustment rod 56, the angle between the extension direction of the adjustment rod 56 and the extension direction of the slot 58 is changed and thus, the microphone 40 rotates. Accordingly, the aiming angle of the microphone 40 may be adjusted.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A microphone device, comprising:

a frame;

a plurality of microphones, each microphone including a head which detects a voice of a user and a body extending in a length direction from the head toward a reference point and hingedly connected to the frame;

at least one barrier rib which passes the reference point, extends in a radial direction, and has a predetermined height in a vertical direction to physically divide the plurality of microphones; and an angle adjustment device which is slidably connected to one end of the body extending in the length direction toward the reference point in the length direction of the body to rotate the corresponding microphone relative to the frame in the vertical direction.

2. The microphone device of claim 1, wherein the angle adjustment device includes:

an adjustment rod including one end which extends to an outside of the frame to be slidably connected to one end of the body and the other end which is disposed in the frame and includes a gear unit;

a motor which includes a motor shaft and receives power to rotate the motor shaft; and a driving gear which is fixedly mounted at the motor shaft to rotate together with the motor shaft and is engaged with the gear unit of the adjustment rod to move the adjustment rod along an extension direction while rotating.

3. The microphone device of claim 2, wherein a slot is formed in the body in the length direction and concave rail grooves are formed on both sides of the slot, and protrusions protruding to both sides are formed on both sides of the adjustment rod to be disposed in the corresponding rail grooves.

4. The microphone device of claim 3, wherein a width between the protrusions is equal to or smaller than a width between the rail grooves and larger than a width of the slot so that the protrusions are slidable along the slot and the rail groove, but do not deviate from the slot.

5. The microphone device of claim 2, wherein the body is hingedly connected to the frame through a hinge pin so that as the adjustment rod slidably connected to the one end of the body moves along the extension direction, the microphone rotates around the hinge pin in the vertical direction.

6. The microphone device of claim 1, wherein the at least one barrier rib divides a space in the vehicle into a plurality of areas according to seated positions of the user and one microphone is disposed in one area.

7. A voice recognition system, comprising:

a calling unit configured to receive a start intention of the voice recognition system and generate a system start signal;

an image recognition unit configured to detect an image of a user;

a microphone device including a plurality of microphones configured to detect a voice of the user; and a controller configured to receive the system start signal from the calling unit to generate a system activation signal, transmit the system activation signal to the image recognition unit and the microphone device to activate the voice recognition system, receive the image of the user from the image recognition unit in an active state of the voice recognition system to extract a skeleton of the user from the image of the user, estimate an utterance point of the user on the skeleton of the user, determine the microphone corresponding to the estimated utterance point, calculate a movement amount to allow the corresponding microphone to be directed to the utterance point, and move the corresponding microphone by the movement amount.

8. The voice recognition system of claim 7, wherein the corresponding microphone is further configured to move by the movement amount and detect the voice of the user to transmit the voice to the controller, and wherein the controller is further configured to receive the voice of the user detected by the corresponding microphone and recognize an instruction indicated by the voice.

9. The voice recognition system of claim 8, wherein the controller is further configured to execute a function according to the recognized instruction.

10. The voice recognition system of claim 7, wherein the calling unit is at least one of a physical button, the microphone, the image recognition unit, and a touch screen.

11. The voice recognition system of claim 7, wherein the microphone device further includes:

at least one barrier rib which passes a reference point, extends in a radial direction, and has a predetermined height in a vertical direction to physically divide the plurality of microphones; and an angle adjustment device which is slidably connected to the corresponding microphone extending in the length direction toward the reference point in the length direction of the corresponding microphone to rotate the microphone relative to the frame in the vertical direction, and wherein each microphone includes a head which detects the voice of the user and a body which extends in the length direction from the head toward the reference point and is hingedly connected to the frame.

12. The voice recognition system of claim 11, wherein the angle adjustment device includes:

an adjustment rod including one end which extends to an outside of the frame to be slidably connected to one end of the body and the other end which is disposed in the frame and includes a gear unit;

a motor which includes a motor shaft and receives power to rotate the motor shaft; and a driving gear which is fixedly mounted at the motor shaft to rotate together with the motor shaft and is engaged with the gear unit of the adjustment rod to move the adjustment rod along an extension direction while rotating.

13. The voice recognition system of claim 12, wherein a slot is formed in the body in the length direction and concave rail grooves are formed on both sides of the slot, and protrusions protruding to both sides are formed on both sides of the adjustment rod to be disposed in the corresponding rail grooves.

14. The voice recognition system of claim 13, wherein a width between the protrusions is equal to or smaller than a width between the rail grooves and larger than a width of the slot so that the protrusions are slidable along the slot and the rail groove, but do not deviate from the slot.

15. The voice recognition system of claim 12, wherein the body is hingedly connected to the frame through a hinge pin so that as the adjustment rod slidably connected to the one end of the body moves along the extension direction, the microphone rotates around the hinge pin in the vertical direction.

16. The voice recognition system of claim 11, wherein the at least one barrier rib divides a space in the vehicle into a plurality of areas according to seated positions of the user, and one microphone is disposed in one area.

17. A voice recognition method, comprising:

generating a system start signal, by a calling unit which receives a start intention of a voice recognition system;

generating a system activation signal by receiving the system start signal from the calling unit, by a controller;

activating the voice recognition system by the system activation signal, by the controller;

extracting a skeleton of a user by receiving an image of the user in an active state of the voice recognition system, by the controller;

estimating an utterance point of the user on the skeleton of the user, by the controller;

determining a microphone corresponding to the estimated utterance point, among a plurality of microphones included in a microphone device, by the controller;

calculating a movement amount to allow the corresponding microphone to be directed to the utterance point, by the controller; and moving the corresponding microphone by the movement amount, by the controller.

18. The voice recognition method of claim 17, further comprising:

detecting a voice of the user to transmit the voice to the controller, by the corresponding microphone; and recognizing an instruction indicated by the voice by receiving the voice of the user, by the controller.

19. The voice recognition method of claim 18, further comprising:

executing a function according to the recognized instruction, by the controller.

20. The voice recognition method of claim 17, wherein the calling unit is at least one of a physical button, the microphone, the image recognition unit, and a touch screen.

* * * * *